US007020478B1

(12) United States Patent
Collette

(10) Patent No.: US 7,020,478 B1
(45) Date of Patent: Mar. 28, 2006

(54) SERVER FOR CONTROLLING TELECOMMUNICATION AND/OR COMPUTER EQUIPMENT USING SHORT MESSAGES OF STATIONARY OR MOBILE TELEPHONES

(75) Inventor: Christian Collette, Verson (FR)

(73) Assignee: France Telecom (SA), Paris (FR)

( * ) Notice: Subject to any disclaimer, the term of this patent is extended or adjusted under 35 U.S.C. 154(b) by 364 days.

(21) Appl. No.: 10/048,137

(22) PCT Filed: Jul. 21, 2000

(86) PCT No.: PCT/FR00/02121

§ 371 (c)(1),
(2), (4) Date: Jun. 12, 2002

(87) PCT Pub. No.: WO01/08392

PCT Pub. Date: Feb. 1, 2001

(30) Foreign Application Priority Data

Jul. 22, 1999 (FR) .................................. 99 09553

(51) Int. Cl.
*H04Q 7/20* (2006.01)
*H04M 11/04* (2006.01)
*H04M 3/42* (2006.01)

(52) U.S. Cl. .............. 455/466; 455/404.1; 379/210.01; 370/352

(58) Field of Classification Search ................ 455/466, 455/41.2, 455, 404.1; 379/212.01, 265.04, 379/210.01; 370/356, 352; 369/29.01
See application file for complete search history.

(56) References Cited

U.S. PATENT DOCUMENTS 4,975,896 A * 12/1990 D'Agosto et al. ....... 369/29.01
5,090,051 A * 2/1992 Muppidi et al. ............ 455/410

(Continued)

FOREIGN PATENT DOCUMENTS

DE      42 18 376      12/1993
DE      97 29609      8/1997

(Continued)

*Primary Examiner*—William Trost
*Assistant Examiner*—Kiet Doan
(74) *Attorney, Agent, or Firm*—Patterson, Thuente, Skaar & Christensen, P.A.

(57) ABSTRACT

A server for controlling telecommunications and/or computer equipment having a digital transmission link to the equipment. The server can receive and interpret short messages (SMS or UUS messages) including commands and send the commands to the telecommunications or computer equipment through the digital transmission link.

6 Claims, 4 Drawing Sheets

U.S. PATENT DOCUMENTS

| | | | |
|---|---|---|---|
| 5,742,596 A * | 4/1998 | Baratz et al. | 370/356 |
| 5,809,127 A | 9/1998 | Ostrcil | |
| 5,937,051 A * | 8/1999 | Hurd et al. | 379/212.01 |
| 5,937,344 A * | 8/1999 | Zicker | 455/404.1 |
| 5,960,073 A * | 9/1999 | Kikinis et al. | 379/265.04 |
| 6,094,678 A * | 7/2000 | Nethercott et al. | 709/220 |
| 6,141,562 A * | 10/2000 | Eriksson | 455/555 |
| 6,205,330 B1 * | 3/2001 | Winbladh | 455/426.1 |
| 6,333,973 B1 * | 12/2001 | Smith et al. | 379/88.12 |
| 6,370,389 B1 * | 4/2002 | Isomursu et al. | 455/466 |
| 6,389,276 B1 * | 5/2002 | Brilla et al. | 455/413 |
| 6,424,828 B1 * | 7/2002 | Collins et al. | 455/412.1 |
| 6,560,456 B1 * | 5/2003 | Lohtia et al. | 455/445 |
| 6,563,814 B1 * | 5/2003 | Rowan et al. | 370/352 |
| 6,594,255 B1 * | 7/2003 | Neuman | 370/352 |
| 6,622,015 B1 * | 9/2003 | Himmel et al. | 455/414.1 |
| 6,847,632 B1 * | 1/2005 | Lee et al. | 370/352 |
| 6,879,674 B1 * | 4/2005 | Strandberg | 379/210.01 |
| 2002/0141557 A1 * | 10/2002 | Strandberg | 379/210.01 |

FOREIGN PATENT DOCUMENTS

| | | |
|---|---|---|
| DE | 197 09 827 | 9/1998 |
| EP | 0 841 797 | 5/1998 |
| WO | WO 97/29609 * | 8/1997 |
| WO | WO 00/07391 * | 2/2000 |

* cited by examiner

SERVER FOR CONTROLLING TELECOMMUNICATION AND/OR COMPUTER EQUIPMENT USING SHORT MESSAGES OF STATIONARY OR MOBILE TELEPHONES

RELATED APPLICATIONS

This application claims priority to PCT Application No. PCT/FR00/02121, filed Jul. 21, 2000, and French Application No. FR 99 09553, filed Jul. 22, 1999.

BACKGROUND OF THE INVENTION

1. Field of the Invention

The invention relates to a server for controlling telecommunications and/or computer equipment using the short messages of fixed or mobile telephones.

The telecommunications equipment may be an automatic branch exchange capable of performing an automatic call-back function by which a user outside his company can be called back at the company's expense in order to communicate with a correspondent using his telephone terminal.

The computer equipment may be an item of home automation or interactive equipment.

2. Discussion of the Related Art

Hitherto, it has been possible to obtain remote access to telecommunications and/or computer services, especially for private installations, by means of a telephone or a data terminal that can get connected to a voice and/or data server of the company through the switched telephone network (STN).

Access to the telecommunications and/or computer services is obtained by voice access means that are slow or by complex connections, using modems for example.

FIG. 1 illustrates an exemplary system according to the prior art. In this system, a private entity EP is shown. This private entity contains a set of user telephone units 10 connected to a private automatic branch exchange 20. The automatic branch exchange is connected to a switched telephone network R1 as well as to a voice and/or data server 40 by means of a telephone line LT. The private automatic branch exchange is also connected by a CTI link referenced L to a CTI server (i.e. a computer-telephony integration server) 30.

A remote user (who may not have a telephone unit 10 connected to the private automatic branch exchange) will therefore use his telephone 11 or his data terminal 12, in this system, to access the company's voice and/or data server 40 through the network R1. When access is obtained, the server asks the user to enter the sequence appropriate to the requested service. The server 40 sends on this sequence to the CTI server that is capable of conducting the requisite programming operation in the private automatic branch exchange 20.

If the requested service is an operation of call forwarding from the user's telephone unit, then the call to the user's unit will be forwarded to the number given by said user by means of his telephone unit 11 or a data terminal 12.

For example, in the case of a remote command for call forwarding from the telephone unit attached to a private automatic branch exchange (PABX).

To perform this function with the system that has just been described, two methods may be considered:
  access to a voice server or,
  access by modem, Internet or Minitel.

According to the function, when the person is outside the company, he will be able to carry out remote call forwarding from the telephone unit in the company to the number of his GSM terminal so that calls sent to his telephone unit in the company can be received on his GSM terminal.

In the case of voice access, the user must call the number of the voice server in the company from a telephone. One possible sequence is the following:
  the company's voice server is called,
  the voice server takes the call and requests the user to key in the following by means of a DTMF (dual-tone modulation frequency) sequence:
    the number of the user's telephone unit in the company (for example keying in four DTMF keys of the telephone keypad),
    a personal password in order to authenticate the user (for example four DTMF keys),
    the type of forwarding desired, cancellation of forwarding or request for forwarding (one or two DTMF keys),
    the forwarding number to which the calls intended for the telephone in the company will be forwarded,
  the telephone unit is disconnected and the call is taken into account.

In this method, the user will take about 90 seconds to enter the information and carry out this function.

In case of data access in general (using a modem, Minitel or Internet access), the user must get connected with the terminal appropriate to the server in the company. One possible sequence is as follows:
  the user connects to the company server and an entry page is proposed to the user to be filled in with the following information:
    the number of the user's telephone unit in the company (for example the keying in of four digits)
    a personal password in order to authenticate the user (for example four digits),
    the type of call forwarding desired, cancellation of forwarding or request for forwarding (several choices),
    the call forwarding number to which the calls sent to the company telephone unit will be forwarded,
  the data terminal is disconnected and the call is taken into account.

In this method, the user will take about 90 seconds to enter the information and carry out this function.

The aim of the invention is to enable faster access to a telecommunications and/or computer service. This is obtained by means of a system using short messages to convey command parameters addressed to the server.

These messages can be sent by telecommunications terminals such as mobile telephony terminals for which the short message service (SMS) will be used or else by means of fixed telephone terminals using the integrated services digital network (ISDN), the messages being then sent according to the User-to-User Signalling (UUS) standard.

Advantageously, the messages could be pre-programmed in the telecommunications terminals.

Thus, through the use of short messages from a telephone terminal, the use of the telecommunications and/or computer services of an operator or of a private entity are easy and quick. The ISDN and GSM terminals for example can be advantageously used within the framework of this invention.

OBJECTS AND SUMMARY OF THE INVENTION

According to the present invention, the proposed system, which is given by way of an example, enables much faster access since the user can use a mobile telephone 11 or a telephone terminal 13A or a data terminal 13B, in using the GSM mobile telephony network or the ISDN digital transmission network to gain direct access to the server terminal.

The command parameters of the desired service will be conveyed in the form of short messages according to the GSM mobile telephony standard, namely the SMS standard or according to the digital transmission standard of an ISDN standard which is the UUS standard.

An object of the invention more particularly is a server for controlling telecommunications and/or computer equipment comprising a digital transmission link to said equipment, chiefly characterized in that it comprises means for the reception and interpretation of short messages (SMS or UUS messages) including commands and means for sending said commands to said telecommunications or computer equipment through said digital transmission link.

The invention also pertains to a control device comprising a server as described here above and at least one piece of telecommunications and/or computer equipment controlled by said server, characterized in that the piece of computer equipment is a piece of home automation equipment or, the command received by the server (40) being sent by a telecommunications terminal (11 or 13A or 13B), a piece of interactive equipment capable, in return, of sending short messages to said server addressed to the terminal (11 or 13A or 13B) that has sent the command.

The invention also relates to a control device comprising a server as described here above and at least one piece of telecommunications and/or computer equipment controlled by said server, the command received by the server being sent by a telecommunications terminal, characterized in that the command includes a call number of a telecommunications terminal, in that the telecommunications equipment is an automatic branch exchange comprising means to call back the terminal that is the sender of the short message and means for linking said sender terminal with the telecommunications terminal identified by said call number.

Finally, the invention relates to a control system comprising a device as described, characterized in that it comprises a plurality of telecommunications terminals capable of sending short messages (SMS or UUS messages) conveying command parameters addressed to said server for the activation and/or programming of said telecommunications and/or computer equipment or pieces of equipment.

According to one characteristic of the invention, the terminals are mobile telephony terminals, the short messages being SMS messages or ISDN digital terminals, the short messages being UUS messages.

The short messages may be pre-programmed in the terminals.

BRIEF DESCRIPTION OF THE DRAWINGS

Other particular features and advantages of the invention shall appear more clearly from the following description given by way of a non-restrictive example, with reference to the appended drawings of which.

DESCRIPTION OF THE PREFERRED EMBODIMENTS

Figure 1:
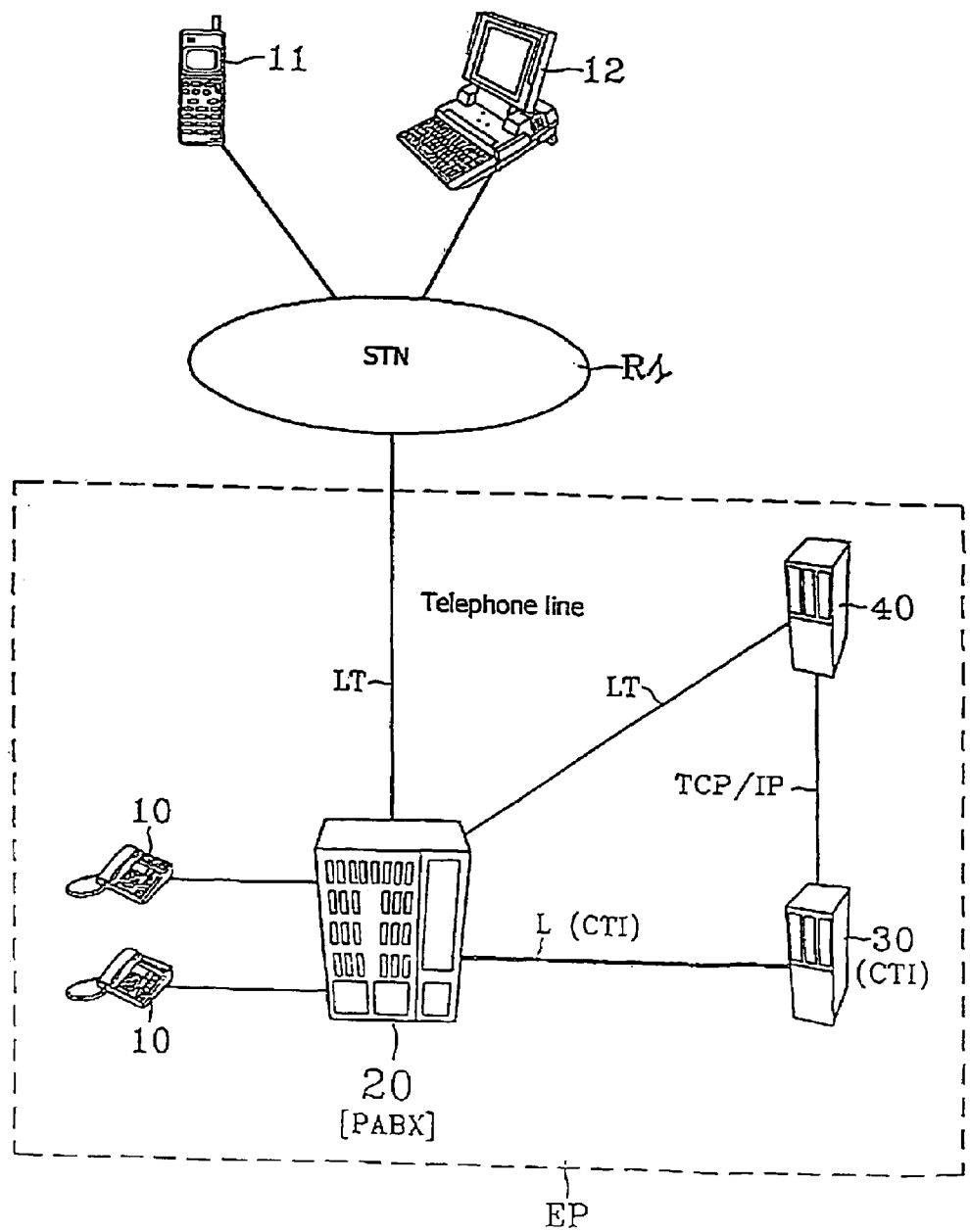
FIG. 1, which has already been described, is the drawing of a system of access to telecommunications and computer services according to the prior art and, FIG. 2 is the drawing of a system of access to telecommunications and computer services according to an application of the present invention
Figure 2:
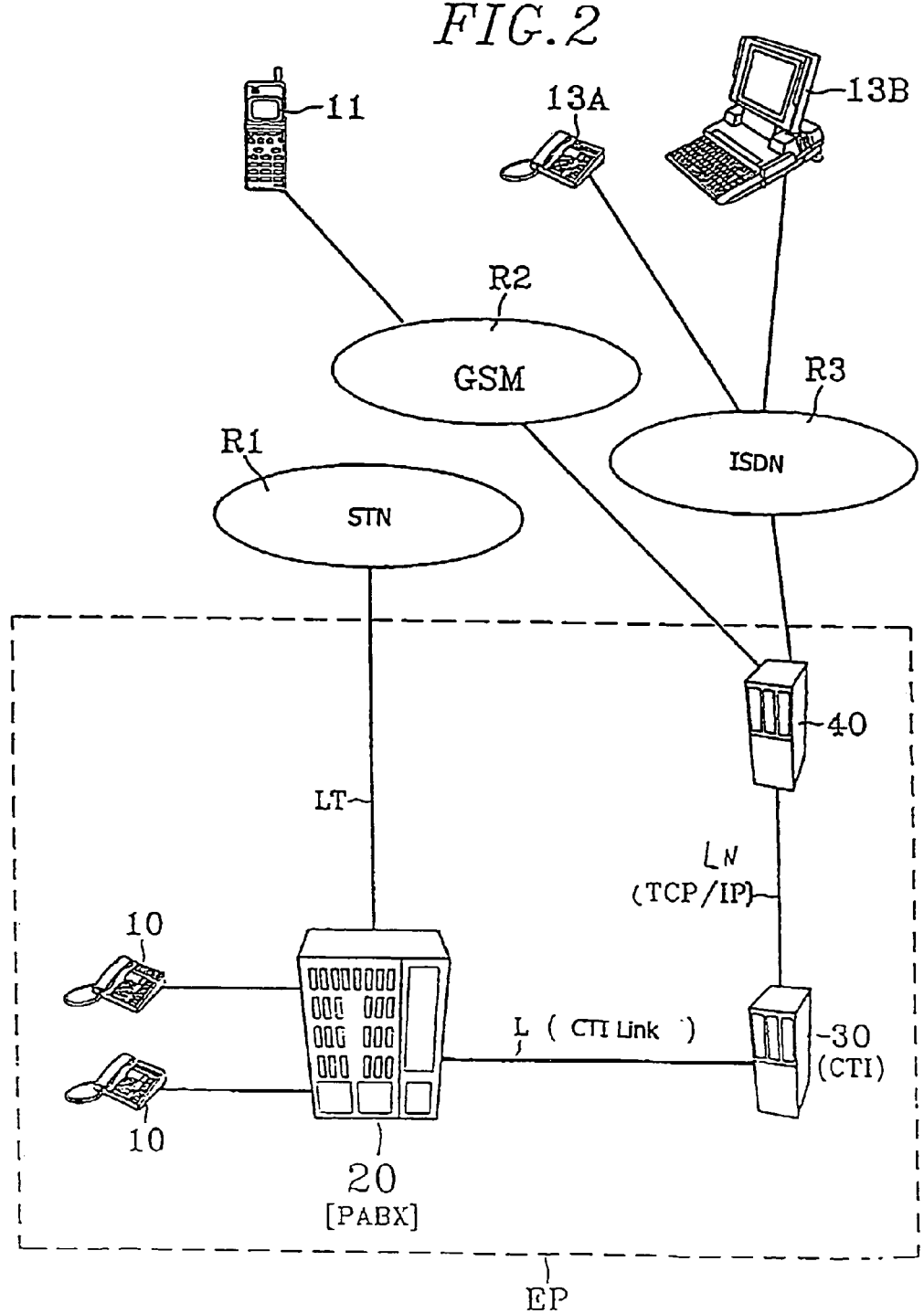

The system taken as an example and shown in FIG. 2 therefore comprises a telephone installation EP (a private installation in this example) fitted out with several telephone units connected to an automatic branch exchange 20.

The automatic branch exchange 20 is connected by a telephone line LT to the switched telephony network STN, bearing the reference R1 in the drawing. Furthermore, this automatic branch exchange 20 is connected by a CTI link L to the CTI server 30.

The CTI server 30 is connected to a remote terminal 40 known as a control server. The communications between the remote terminal and the CTI server are obtained by means of a digital transmission line according to the TCP/IP protocol.

The remote server 40 is accessible through the mobile telephony networks R2 or the ISDN digital data transmission network R3. This access can be achieved respectively by means of telecommunications terminals such as mobile telephony stations 11 or telephony terminals 13A or data transmission terminals 13B.

A remote user will use his mobile telephony station 11 for the dispatch, according to the invention, of an SMS short message directly to the remote server terminal which will interpret it to order the implementation of the requested service. The CTI server 30 will then transmit this request to the automatic branch exchange (PABX) 20 through the appropriate protocol of the CTI link. Calls to the user's telephone unit 10 will therefore be forwarded to the number indicated by said user.

Thus, a user will use the short message sending function of his GSM terminal to be able to activate the requested service, especially to drive the operation of remote call forwarding from a company telephone unit to the number of his GSM for example.

A user can advantageously pre-program the short-message requests for the forwarding of calls to his GSM terminal and call up this function at the desired time through the menu of the short message service.

Thus, a short message is sent from the GSM terminal to the remote server terminal 40 which is capable of receiving these short messages. This terminal reads the short message and interprets it. The short message takes the form of a sequence of information fields needed for the activation of the requested service. This action takes only a few seconds, the time needed to send the SMS short message from the GSM terminal.

In the case of a telephone unit call-forwarding operation, a short message will be constituted, for example, by fields containing the following command parameters separated as the case may be by a neutral field (of the * type):

the number of the user's telephone unit in the company (for example four digit keying-in),
a personal password in order to authenticate the user (for example four digits), the type of call forwarding desired (in the form of a code corresponding to the activated or deactivated forwarding function), the forwarding number to which the calls intended for the company telephone unit are sent.

The short message is sent to the number of the remote server 40.

The following is an example of a short message: 9191*1234*2*1234567890*.

The remote server 40 may also use a function offered by the present-day telephony services for the identification of the caller to identify the user and therefore know the number of the user's telephone in the company. In this case, the short message will not contain the number of the user's telephone unit and will then be of the following type: **1234*2*1234567890*.

Thus, according to the system just described, the user will take about 10 seconds to send the information and carry out the forwarding function.

The remote server terminal 40 may acknowledge the request received. In this case, the server will send a short acknowledgement message to the terminal 11 or 13A, 13B.

We have just seen a detailed view of the way in which the system enables the high-speed remote configuration of call forwarding for a telephone unit attached to a private automatic branch exchange of a company.

Some other services may thus be obtained. Indeed, it is possible to have the automatic call-back service through which a user who is outside his company can get called back at the company's expense to communicate with a correspondent by means of his telephone terminal.

Figure 3:
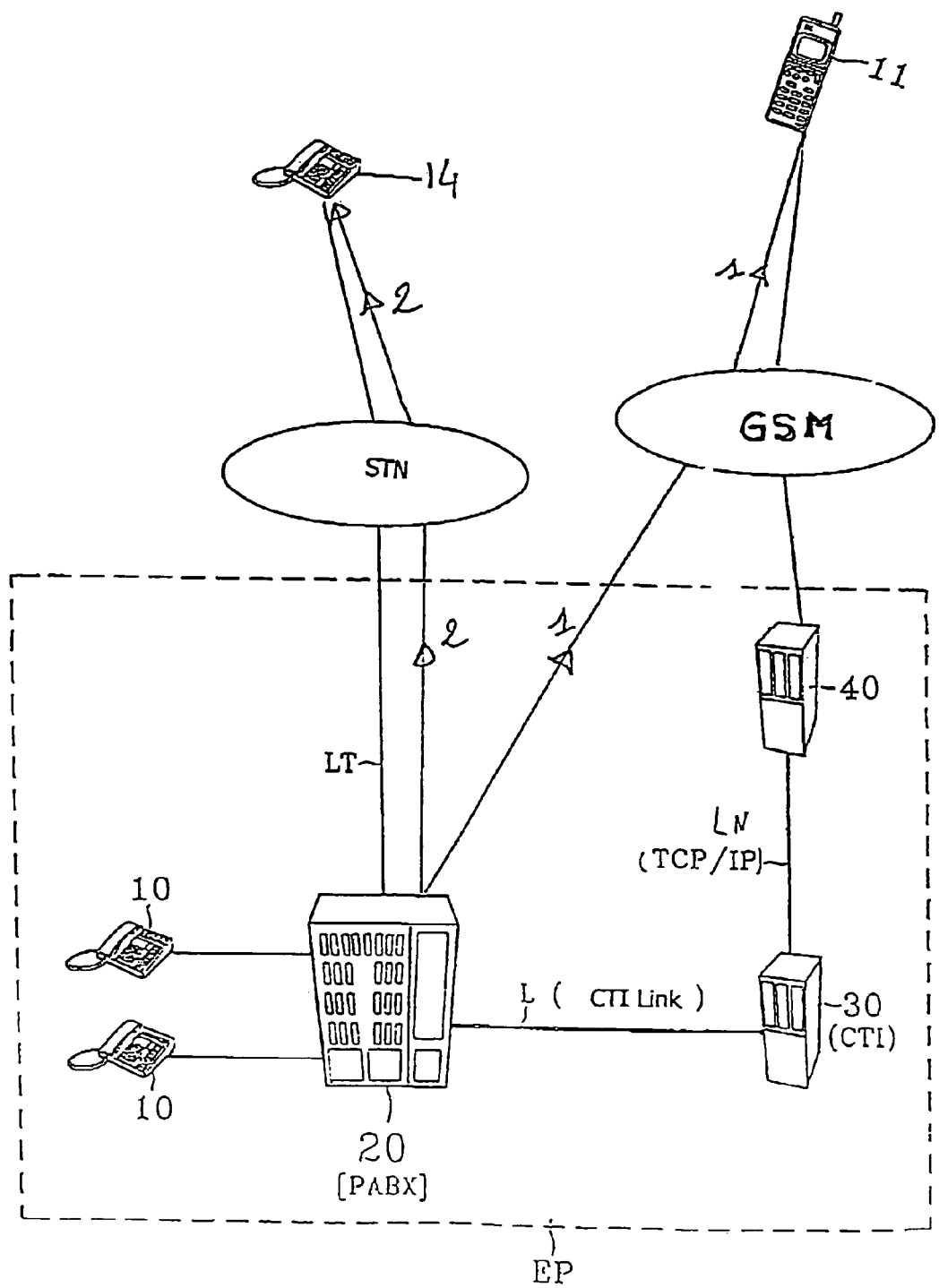
FIG. 3 is the drawing of a system of access to telecommunications and computer services according to another application of the present invention.

This service is provided as follows by using the system shown in FIG. 3.

A GSM telecommunications terminal 11 or ISDN terminal 13A or 13B sends the short message to the server 40, which is installed for example in a private entity EP. Only the example of the GSM terminal 11 is shown in this FIG. 2 so as not to overburden it. The short message will consist for example of fields containing the following command parameters separated as the case may be by a neutral field (of the * type):

the user's personal code (six digits for example) designed to validate the user's rights to the automatic call-back service, the number of the telecommunications terminal 14 to be called, or a name if the server 40 has an incorporated directory.

The server 40, equipped with means for identifying the caller, knows the source of the short message, namely the number of the terminal 11 from which this message has been sent. The server 40 verifies that the user's personal code tallies with the caller's number. If the tallying is verified, the server 40 actuates the automatic branch exchange 20 of the private entity, through the CTI server 30, in order to call the caller who immediately takes the connection since he has just sent the short message (Arrow 1).

The server 40 again actuates the automatic branch exchange 20 in order to make a double call and then a call transfer to the called party (Arrow 2) identified by the number of the telecommunications terminal 14 to be called, indicated in the short message. This transfer links the caller with the called party. The telecommunications terminal 14 may be connected to the STN as shown in the figure, the mobile telephony network or the ISDN.

This invention can also be applied to telecommunications services such as the remote modification of a personal electronic diary by the sending of a short message containing the modification to command parameters, by means of a GSM or ISDN telecommunications terminal.

This invention can also be applied to the field of home automation applications for example to the remote control of the starting or shutting down of a boiler in a dwelling, the activation of a sprinkler or generally the control of any piece of home automation equipment.

Figure 4:
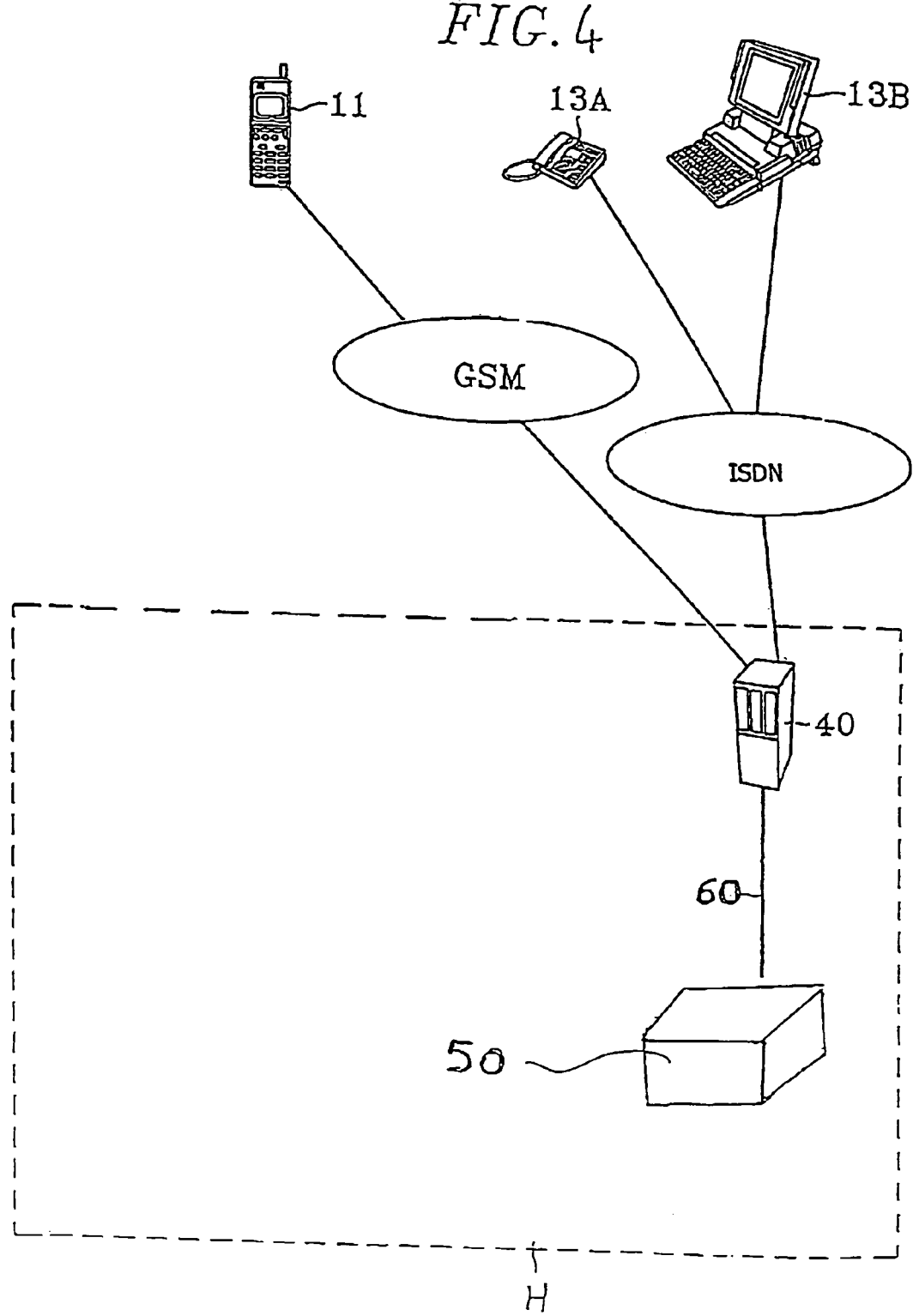
FIG. 4 is a drawing of a system of access to telecommunications and computer services according to a third application of the present invention.

In this case, by using the system shown in FIG. 4, the control server 40, which for example will be a microcomputer (PC), is connected to the home automation equipment 50 by a digital transmission link 60. A GSM telecommunications terminal 11 or ISDN terminal 13A or 13B sends a short message to the server 40, installed for example in a dwelling H. The short message will consist for example of fields containing the following command parameters possibly separated by a neutral field (of the * type).

the user's personal code (six digits for example) designed to validate the rights to use of the home automation service, a field indicating the command related to the service: activation of the boiler 50=I; deactivation=0, etc.

Similarly, interactive systems may be actuated by a server that receives short messages for controlling such systems. In this case, the interactive system may also send out short messages to the sender of the short command message through the server.

What is claimed is:

1. A server for controlling telecommunications or computer equipment, comprising:

a digital transmission link to said equipment, means for the reception and interpretation of short message service (SMS) or user-to-user signaling (UUS) short messages including commands, and means for sending said commands to the telecommunications or computer equipment through the digital transmission link, wherein the commands received by the server are sent by a first telecommunications terminal and include a call number of a second telecommunications terminal, and wherein the telecommunications or computer equipment comprises means to call back the first terminal that is the sender of the short message and means for linking the first terminal with the second telecommunications terminal identified by the call number.

2. A control device comprising:

a server for controlling telecommunications or computer equipment, the server comprising a digital transmission link to the telecommunications or computer equipment, means for the reception and interpretation of short message service (SMS) or user-to-user signaling (UUS) short messages including commands, and means for sending the commands to the telecommunications or computer equipment through the digital transmission link, wherein the commands received by the server are sent by a first telecommunications terminal and include a call number of a second telecommunications terminal, and wherein the equipment comprises means to call back the first terminal that is the sender of the short message and means for linking the first terminal with the second telecommunications terminal identified by the call number, and wherein the telecommunications or computer equipment is a piece of interactive equipment capable, in return, of sending short messages to the server addressed to the first terminal that sent the command.

3. A control system comprising:

a server for controlling telecommunications or computer equipment, the server comprising a digital transmission link to the telecommunications or computer equipment, means for the reception and interpretation of short message service (SMS) or user-to-user signaling (UUS) short messages including commands, and means for sending the commands to the telecommunications or computer equipment through the digital transmission link, wherein the commands received by the server are sent by a first telecommunications terminal and include a call number of a second telecommunications terminal, and wherein the telecommunications or computer equipment comprises means to call back the first terminal that is the sender of the short message and means for linking the first terminal with the second telecommunications terminal identified by the call number;

and a plurality of telecommunications terminals capable of sending SMS or UUS short messages conveying command parameters addressed to the server for the activation or programming of the telecommunications or computer equipment or pieces of equipment.

4. The control system of claim 3, wherein the terminals are mobile telephony terminals and the short messages are SMS messages.

5. The control system of claim 3, wherein the terminals are integrated services digital network (ISDN) digital terminals and the short messages are UUS messages.

6. The control system of claim 3, wherein the short messages may be pre-programmed in the terminals.

* * * * *